C. M. CROOK.
TIME RECORDING DEVICE.
APPLICATION FILED DEC. 8, 1908.
1,143,363.
Patented June 15, 1915.
7 SHEETS—SHEET 5.
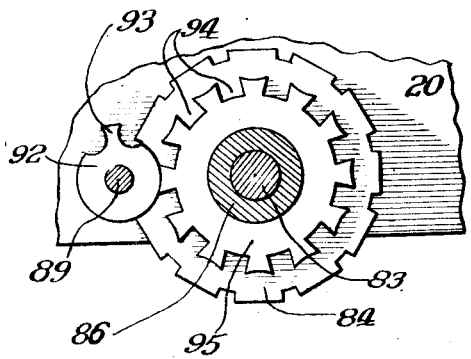
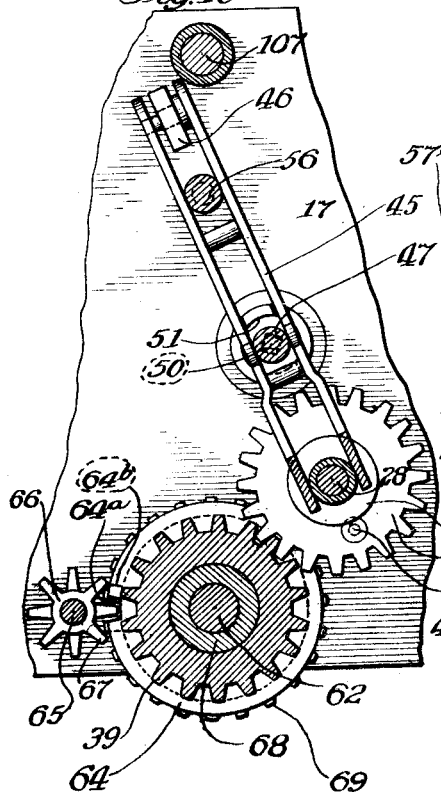
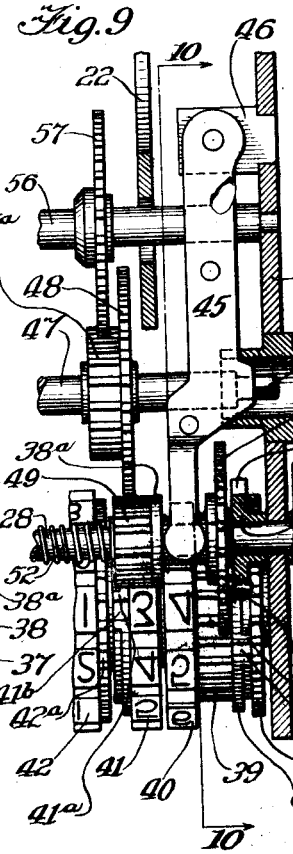
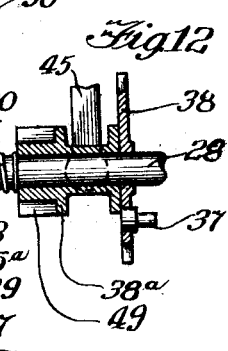
Witnesses:-
Wm. H. Yagle.
Chas. L. Hopkins
Inventor:-
Charles M. Crook,
by Jones, Addington & Ames.
Attys.

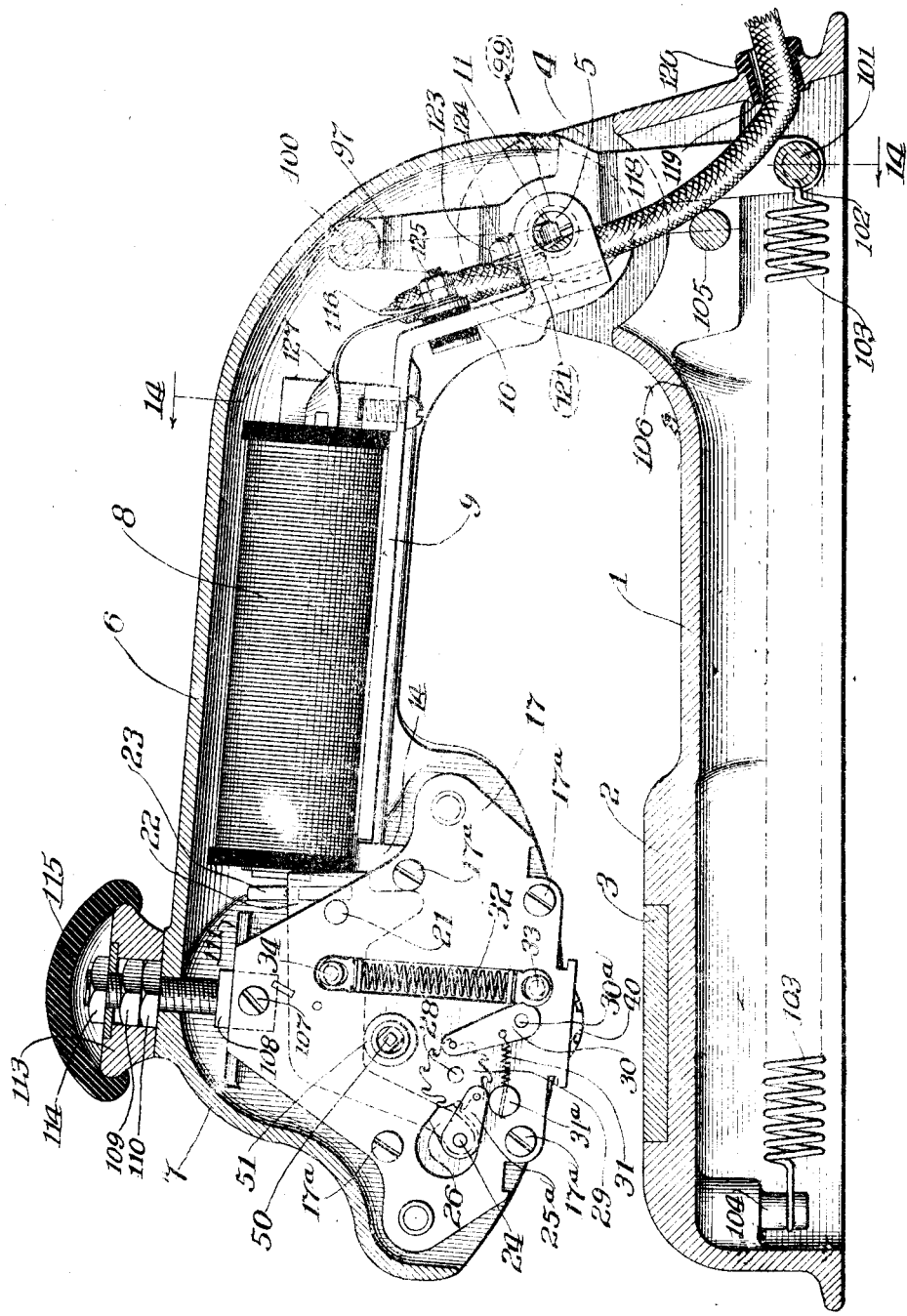

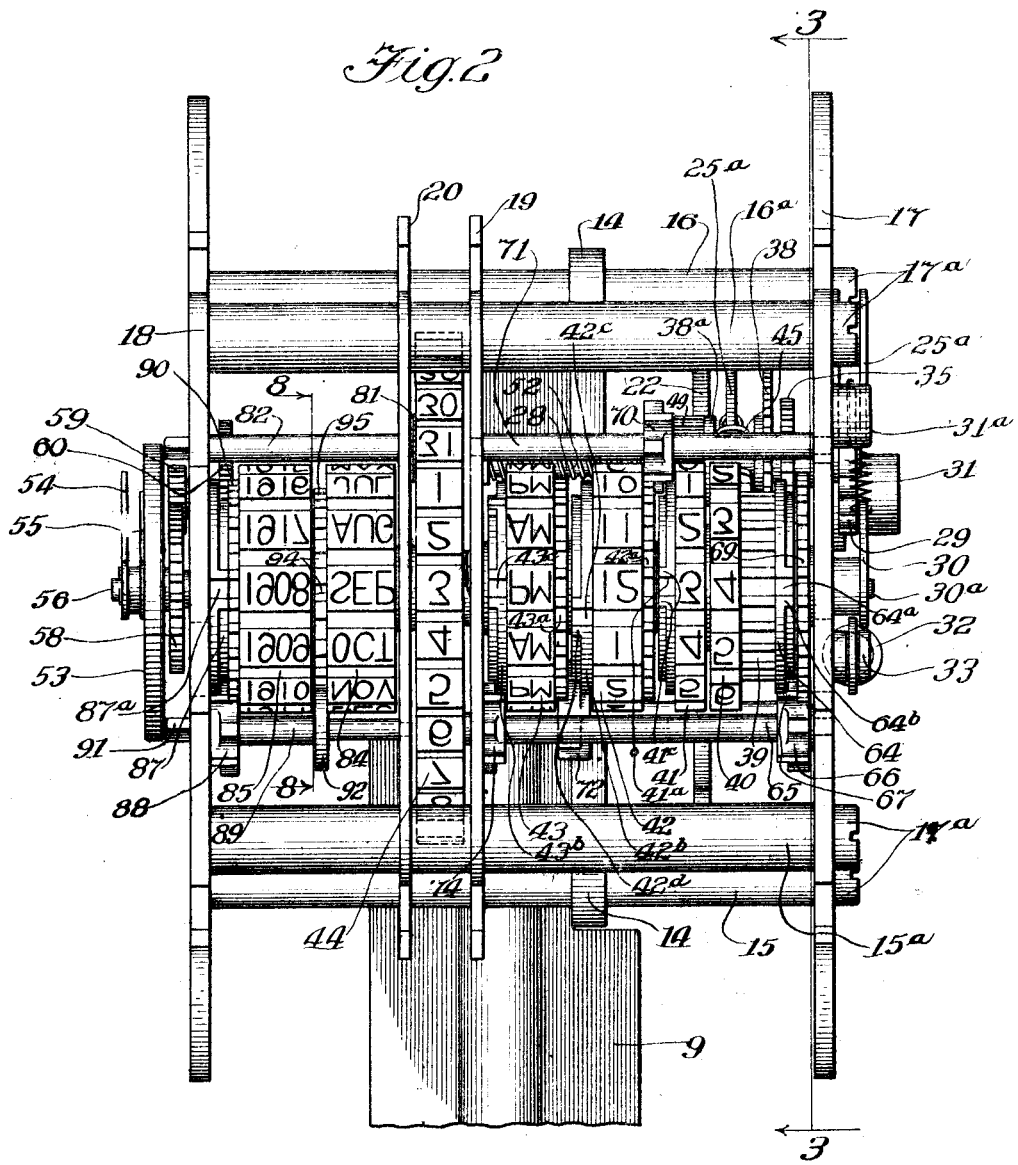

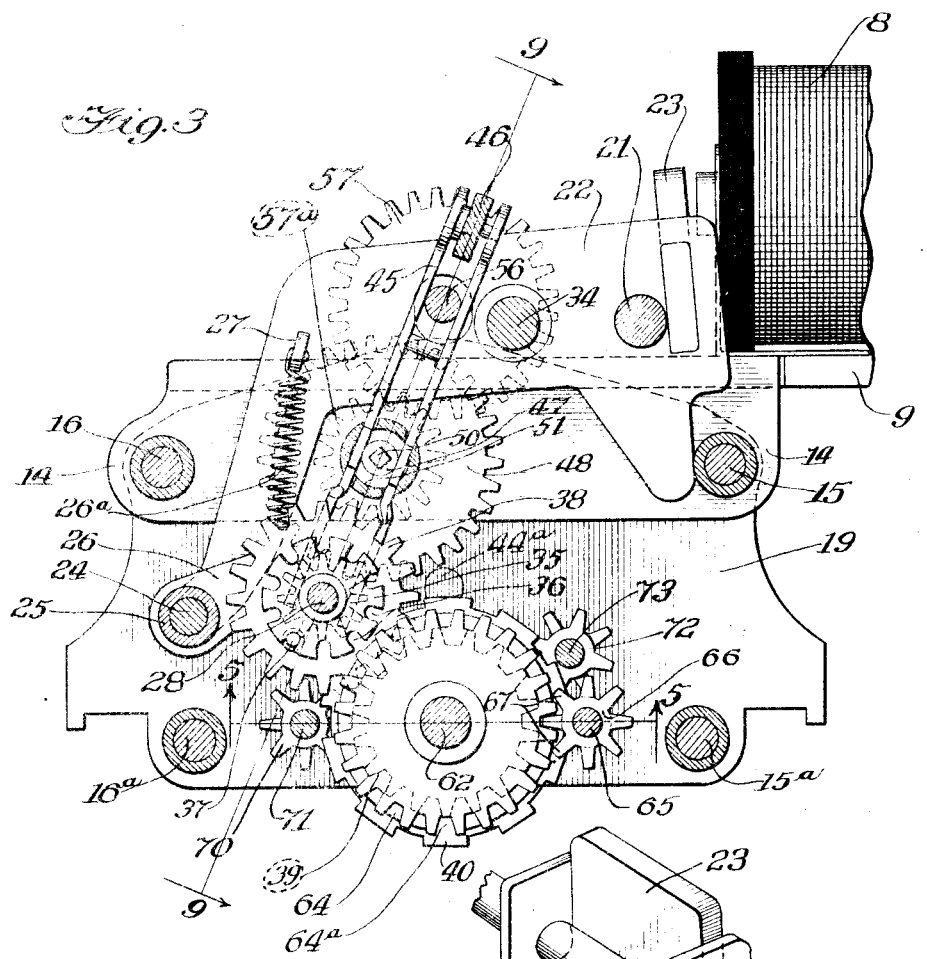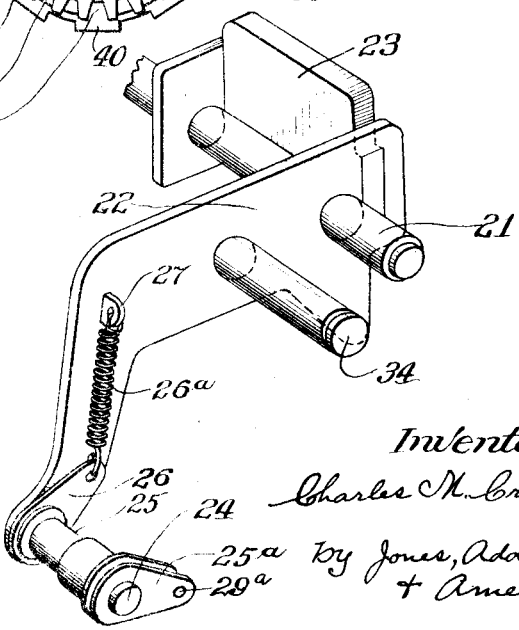

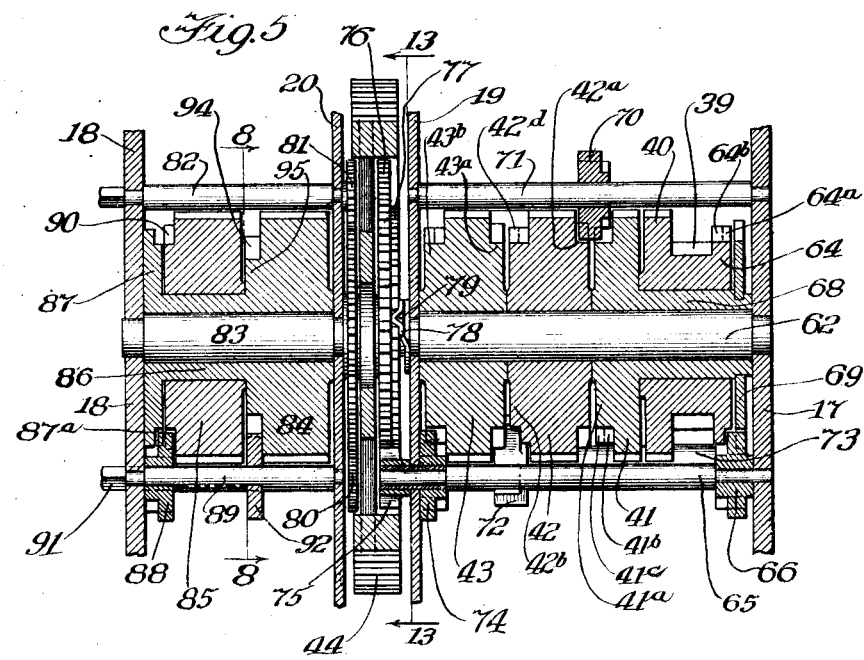
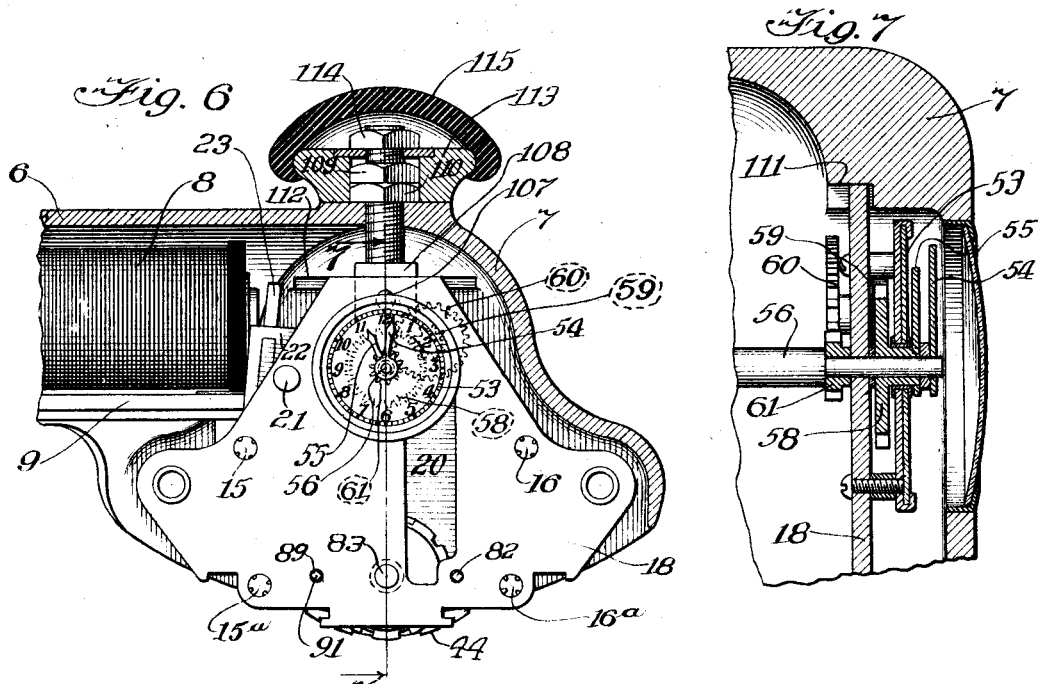

C. M. CROOK.
TIME RECORDING DEVICE.
APPLICATION FILED DEC. 8, 1908.
1,143,363.
Patented June 15, 1915.
7 SHEETS—SHEET 6.
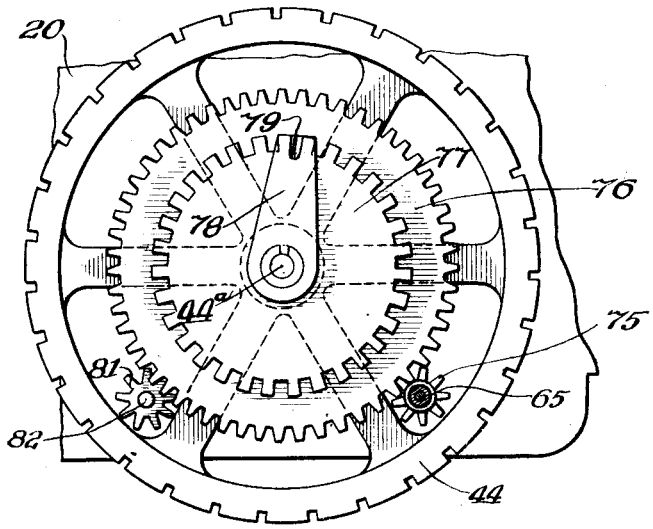
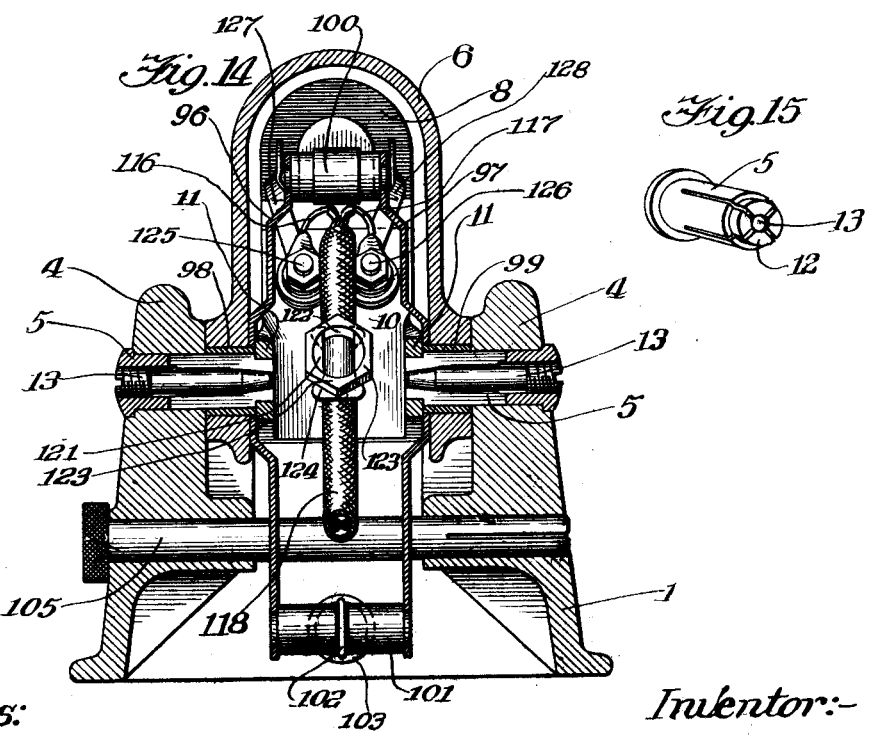
Witnesses:
Wm. H. Yagle
Chas. L. Hopkins
Inventor:-
Charles M. Crook,
by Jones, Addington & Ames,
Attys.

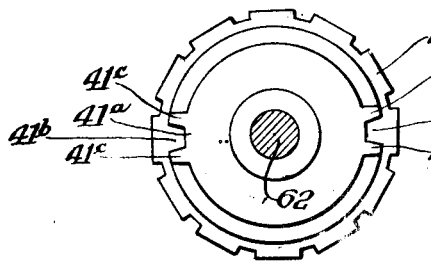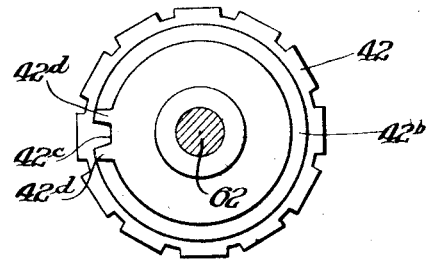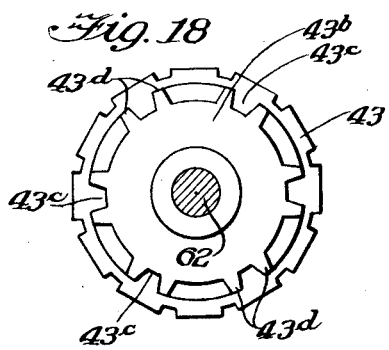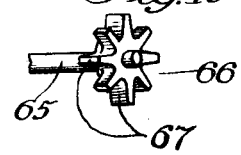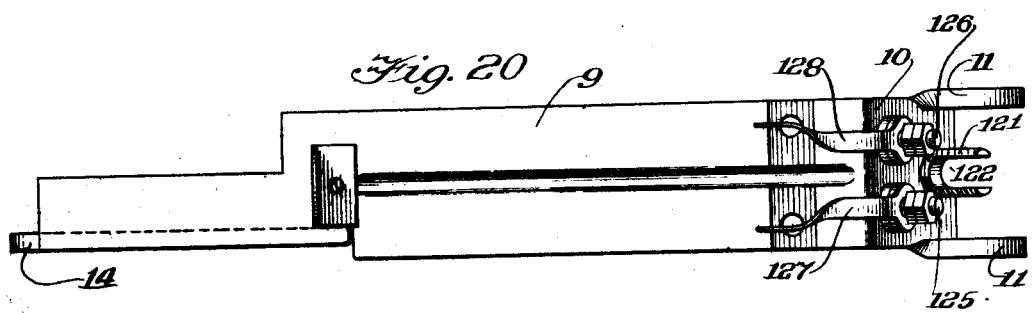

UNITED STATES PATENT OFFICE.

CHARLES M. CROOK, OF CHICAGO, ILLINOIS, ASSIGNOR, BY MESNE ASSIGNMENTS, TO STROMBERG ELECTRIC COMPANY, A CORPORATION OF MAINE.

TIME-RECORDING DEVICE.

1,143,363.　　　　　　Specification of Letters Patent.　　Patented June 15, 1915.

Application filed December 8, 1908. Serial No. 466,486.

*To all whom it may concern:*

Be it known that I, CHARLES M. CROOK, a citizen of the United States, residing at Chicago, in the county of Cook and State of Illinois, have invented new and useful Improvements in Time-Recording Devices, of which the following is a full, clear, concise, and exact description, reference being had to the accompanying drawing, forming a part of this specification.

This invention relates to improvements in time recording devices, said improvements being particularly adaptable to electric time stamps, although applicable also to time recording devices in which means other than electro-magnetic force is employed to drive the mechanism thereof.

One of the objects of the invention is to provide a time recording device having periodically operating motor mechanism, in which it is impossible for the latter to move a printing wheel forward more than the proper distance upon a single impulse. To this end I connect the various automatically advanced printing wheels together so that these wheels are driven in train and locked in train, and arrange the intermittently acting motor mechanism to periodically unlock and advance the first wheel. Thus the first printing wheel normally locks the second printing wheel, the second printing wheel normally locks the third, and so on, each wheel being adapted to unlock the next succeeding wheel and advance the same a single step at the proper time and lock the same immediately thereafter. This method of locking and driving also prevents accidental movement of a printing wheel backward or forward by reason of the jar imparted to the machine when the head is depressed to make an impression. This has been a troublesome feature of time stamps as heretofore constructed. Intentional rotation of one or more wheels by unauthorized persons, to change the reading, is also prevented. When it becomes necessary to move the printing wheels by hand, as, for instance, to set the wheels so that they will print the correct time, this may be accomplished by the use of a suitable key, a clutch which connects the first printing wheel of the series with the motor mechanism being uncoupled by the application of the key to the setting shaft and thereby permitting the printing wheels to be moved independently of said motor mechanism.

Another object is to provide a time stamp which prints upon the upper side of the paper or other article upon which the impression has been made, and in which the printing and motor mechanism is readily accessible for the purpose of inspecting or repairing the same. This is accomplished by mounting the printing and motor mechanism on an arm of its own independently of the arm which carries the casing for the head of the machine and arranging these two arms so that they may be secured one to the other and thus be made to move together.

Another object is to provide means whereby it may be ascertained from a glance what the reading of the stamp will be if an impression be taken therefrom, without the necessity of first taking such impression and examining the same.

This and such other objects as are attained by my invention will appear in the following specification and the accompanying drawings, in which—

Figure 1 illustrates an electric time stamp embodying the features of my invention, the casing thereof being shown in longitudinal section and most of the other parts in elevation; Fig. 2 is an inverted plan view of the printing and transfer mechanism; Fig. 3 is a sectional view of the printing and transfer mechanism shown in Fig. 2, the section being taken on the line 3—3 of Fig. 2, looking in the direction of the arrows; Fig. 4 is a perspective view of the armature and the actuating lever to which the same is secured and which is oscillated when said armature is attracted by the motor magnet, the locking and driving pawl, carried by the lever, and through which the movement of the lever is transmitted to the printing wheels, being also shown in this figure; Fig. 5 is a longitudinal sectional view of the train of printing wheels and the means whereby movement is transmitted from wheel to wheel through the train, the section being taken on the line 5—5 of Fig. 3, looking upward, as indicated by the arrows; Fig. 6 shows a portion of the side of the device opposite that seen in Fig. 1, the casing of the head being broken away to reveal the printing head; Fig. 7 is a broken sectional view taken on the line 7—7 of Fig. 6, looking in the direction indicated by the arrows and illustrating the means for driving the hands of the clock face; Fig. 8 is a sectional view on the line 8—8 of Figs. 2 and 5, showing the means for manually changing the reading of the month printing wheel; Fig. 9 is a view partly sectional on the line 9—9 of Fig. 3, looking in the direction of the arrows, and showing part of the printing wheels and transfer mechanism, as well as the mechanism of the clutch which normally connects the train to the driving means, and which uncouples upon the insertion of the setting key to change the reading of those printing wheels which are automatically driven; Fig. 10 shows a section on the line 10—10 of Fig. 9, looking in the direction of the arrows; Figs. 11 and 12 show details of the clutch mechanism; Fig. 13 shows the means whereby the day printing wheel is impositively coupled to, and normally driven by, the preceding printing wheel of the train, this view being partly sectional on the line 13—13 of Fig. 5, looking in the direction of the arrows; Fig. 14 shows a section taken through the machine on the line 14—14 of Fig. 1, looking in the direction of the arrows and showing the means whereby the head and other parts moving therewith are pivoted to the base; Fig. 15 shows in perspective one of the pins which are used to connect the head and other movable parts pivotally to the base; Figs. 16, 17 and 18 show the tens minute printing wheel, hour printing wheel and meridian printing wheel respectively, and the locking and driving disks associated with or carried by each of said wheels for driving the next succeeding wheel; Fig. 19 is a perspective view of one of the pinions which transmit movement from one printing wheel to the next, and normally lock the wheels against movement; and Fig. 20 is a plan view of a plate which carries the electromagnet and to which is secured the printing mechanism, showing the binding screws and conductor plates which lead to the terminals of the winding of the magnet.

In the several figures, in which like reference numerals indicate the same parts throughout, 1 is the base of the machine, having at one end thereof a receptacle 2 in which is fitted a platen 3, this platen being preferably formed of some slightly resilient material, such as fiber, hard rubber or the like. On this platen will be placed the paper or other article which is to receive the impression of the stamp. The opposite end of the base 1 is provided with a pair of upstanding arms 4, 4, between which is hinged, by pins 5, 5, a movable hollow arm 6, the latter having an enlarged portion 7 forming a head in which is arranged the printing and transfer mechanism. The hollow arm 6 is open along its lower side, having, in cross-sectional form, substantially the shape of an inverted U. Within the arm is arranged an electromagnet 8 which rests upon and is secured to a bent supporting plate 9. This plate 9 has its shorter portion 10 provided with a pair of lugs 11 which are bent around so as to extend substantially parallel with each other and at right angles with the shorter limb 10 of the plate, as clearly shown in Figs. 1 and 20. These lugs 11, 11 are pivoted in line with the axis of movement of the arm relative to the base, being supported by the pins 5, 5 which connect the base and arm together. The plate 9 and arm 6 are thus made independently movable about the same axis, whereby it is possible, when the arm and plate are detached from each other, to swing the arm back independent of the printing mechanism and thereby afford access to the latter for purposes of inspection, adjustment and the like.

By reference to Fig. 14, in which the connection between the arm and the base, and between the supporting plate 9 and the base, are clearly shown, it will be seen that the pivot pins 5, 5 (shown also in Fig. 15) are formed with reduced inner ends 12 which pass into the apertures in the lugs 11 of the plate 9. The pivot pin has a passage extending longitudinally therethrough and is split for part of its length, whereby the inner end may be expanded. An expansion pin 13, having its tip cone-shaped and a portion of its length screw-threaded, is inserted into the pivot pin 5 after the same is in place. The passage through the pivot is of smaller diameter at the inner end of the pin, so that when the expansion pin 13 is screwed into the opening in the pivot pin the inner end of the latter is expanded and caused to fit tightly in the opening in the lug 11. By this means the pivot pin is prevented from working out and the movable parts are securely but hingedly locked together. The plate 9 is formed with a downwardly bent portion extending along one side of that part of the plate which is forward of the magnet, this downwardly bent portion forming a wing or lug 14 which is perforated at two points for the passage of a pair of bars 15 and 16 which extend from one side plate 17 to the other side plate 18 of the stamping mechanism. The stamping mechanism is thus firmly secured to the supporting plate 9. Other bars 15ª and 16ª similarly extend from side to side of the stamping mechanism, the side plate 17 being removable after the screws 17ª are taken out. Between the plates 17 and 18 are arranged other plates 19 and 20, the plates 17, 18, 19 and 20 having openings providing bearings for certain of the shafts on which are mounted the gears and other moving parts of the mechanism.

A shaft 21 is supported at its ends in the plates 17 and 18 and has secured thereto the actuating lever 22 (shown in perspective in Fig. 4). This lever has secured thereto at its shorter end an iron plate 23 which constitutes the armature for the electromagnet 8. The opposite end of the lever 22 is bent downward and carries a pin 24 which extends laterally from the lever through an opening in the side plate 17, as is seen in Fig. 1. On this pin is arranged a sleeve 25 which carries at its end farthest from the lever a locking and driving dog 25$^a$. The sleeve 25 is free to turn on the pin 24 and carries at its inner end an arm 26 to which is secured one end of a spring 26$^a$, the other end of which is secured to a lug 27 extending from the side of the lever 22. A shaft 28 is supported in the side plate 17 and the plate 19 and projects slightly beyond the side plate 17. Secured to this shaft, at its end outside the plate 17, and turning with said shaft, is a locking and driving ratchet wheel 29 driven intermittently by the engagement therewith of a pin 29$^a$ carried by the driving dog 25$^a$ when the lever is oscillated. To prevent the ratchet wheel turning backward when the dog 25$^a$ is moved back over the teeth of the ratchet wheel there is provided a pawl 30, mounted on a stud 30$^a$ and moved toward the ratchet wheel by a spring 31 which is secured at one end to the pawl and at its opposite end to a stud 31$^a$. A spring 32 is secured at one end to a stud 33 projecting from the side plate and at its opposite end to a pin 34 which projects from the side of the lever 22. When the armature 23 is attracted by the electromagnet 8, the lever 22 is swung on the shaft 21 as a fulcrum and the longer end of the lever, with the pawl 23 carried thereby, are raised, the dog 25$^a$ slipping back over one tooth of the ratchet and engaging with the next succeeding tooth. When the armature is relieved from the influence of the magnet by the breaking of the circuit, the spring 32 draws the lever down, moving the ratchet wheel around one space and jamming the dog 25$^a$ in between the ratchet wheel and the stud 31$^a$, as shown in Fig. 1. The ratchet wheel is thus prevented from turning in either direction when the magnet is deënergized, and is prevented from turning when the armature is energized and the dog moved over the ratchet wheel by the other pawl 30.

Turning with the ratchet wheel is a disk 35 (shown by itself in Fig. 11) provided with ten notches or openings 36 corresponding in number with the teeth of the ratchet into some one of which normally extends a pin 37 projecting from the side of a gear wheel 38, loose on the shaft 28, whereby the rotation of the ratchet is imparted to said gear wheel. This gear wheel 38 meshes with a gear wheel 39 which turns with the first printing wheel 40, this printing wheel having its periphery divided into ten spaces bearing the numbers 1 to 9 and 0. The tens minute printing wheel 41, the hour printing wheel 42, the meridian or A. M. and P. M. printing wheel 43 and the day printing wheel 44 are driven from the units minute printing wheel 40 in such a manner that each printing wheel locks the next succeeding printing wheel; in other words the wheels are driven in train and locked in train, as will be hereinafter explained. Furthermore, by having the number of notches on the disk 35 equal to the number of teeth on the intermittently rotated ratchet, when the printing-wheels are disconnected from the ratchet for the purpose of setting they will be in synchronism with the driving mechanism when again connected. This arrangement, therefore, provides what might be termed a synchronizing or alining clutch between the driving mechanism of the stamp and the printing mechanism. The gear 39, which turns with the units minute printing wheel 40, has teeth of considerable width so that the gear 38 may be moved along on its shaft to disengage the pin 37 carried thereby from the notch 36 in the disk 35 without disengaging the gear 38 from the gear 39. When a setting key is inserted to change the printing wheels to give a new reading, the two parts of the clutch comprising the disk 35 and the pin 37 are separated so as to uncouple the printing wheels and parts moving therewith from the motor mechanism. The gear 38 has an elongated hub 38$^a$ in which is formed a groove, and in this groove ride the ends of a bifurcated lever 45 pivoted at its upper end to a lug 46 on the inner side of the side plate 17. Extending between the members of the lever 45 is a setting shaft 47 carrying a gear 48, fast thereon, in mesh with a pinion 49 fast on the hub 38$^a$ of the gear 38. This pinion 49 has teeth of considerable width, so that when the gear 38 and pinion 49 are moved along on the shaft, the pinion will remain in mesh with the gear 48 on the setting shaft. The outer end 50 of the setting shaft 47 is squared to receive a setting key. The side plate 17 is provided with a suitable opening having a bushing 51 inserted therein and extending toward the side of the casing of the head and registering with an opening (not shown) therein for the reception of the key. When the key is inserted in the bushing 51, it encounters the lever 45 and the key shaft cannot be turned until this lever has been swung inward by the key and thereby moved the gear 38 along on its shaft, thereby withdrawing the pin 37 from the recess in which it is resting in the disk 35. When the key is thrust in far enough to thus swing the lever on its pivot and thereby slide the gear and pinion along on the shaft and uncouple the two parts of the clutch formed by the pin and disk the setting shaft may be turned. Revolving this shaft causes the units minute printing wheel 40 to be revolved, as the gear 48 on the setting shaft remains in mesh with the pinion 49, and the gear 38 which is fast on the hub of the pinion 49 remains in mesh with the gear 39 fast with the printing wheel 40. A spring 52 is coiled about the shaft 28 and is arranged to thrust the movable member of the clutch into engagement with the stationary member when the setting key is removed.

A clock face 53 and hands 54 and 55 are provided for the purpose of indicating the time that will be printed by the printing wheels. The minute hand 54 is carried by and turns with a shaft 56 which carries fast thereon a gear 57 in mesh with a pinion 57ª fast on the setting shaft 47. The hour hand 55 turns with a gear 58 in mesh with a pinion 59 turning with a gear 60 meshing with a pinion 61 fast on the shaft 56. By means of this train of gearing the movement of the hour hand is reduced to afford the proper relative rate of movement between the hour and minute hands.

The shaft 62, on which are arranged the units minute printing wheel 40, the tens minute printing wheel 41, the hour printing wheel 42 and the meridian printing wheel 43, is supported in the side plate 17 and the plate 19. Arranged in line therewith, and supported in the plates 19 and 20, is the shaft 44ª on which is secured the day printing wheel 44. These wheels 40 to 44 inclusive are all advanced by the motor mechanism.

At each forward movement of the ratchet wheel 29 the gear 38, which is coupled thereto by the clutch, is moved forward the proper distance to change the reading of the units minute wheel 40 to the next higher number. Turning with the printing wheel 40 and the gear 39, and preferably made in one piece therewith, is a disk 64 having one notch 64ª in its edge. Projecting from the side of the disk 64 are a pair of projections 64ᵇ on opposite sides of the notch 64ª in the disk. (See Figs. 2, 5 and 10).

Secured on a long counter-shaft 65, supported in the plates 17 and 19, is a star wheel or pinion 66, shown in perspective in Fig. 19. This star wheel has every alternate tooth cut away for a portion of its width, two of the wide teeth 67 normally resting against the edge of the disk 64, whereby the star wheel 66 is prevented from rotating. When, however, the units minute printing wheel 40 and the gear 39 and disk 64 have turned to such a position that this printing wheel has printed the digit 9, further rotation will bring the notch 64ª in the disk to such a position as to receive one of the wide teeth 67 of the star wheel, and at the same time one of the projections 64ᵇ on the disk will engage another tooth, thereby turning the star wheel, the notch admitting the wide tooth, as seen in Fig. 10, and permitting such rotation.

The tens minute printing wheel 41 has an elongated bearing 68 extending through the bearing of the units minute wheel and carrying at its farther end a gear wheel 69, the units minute wheel by this construction being made to turn on the sleeve which constitutes the long bearing 68 of the tens minute wheel, and being located between the tens minute wheel and the gear 69 which turns therewith. This gear 69 meshes with the pinion or star wheel 66 and is driven thereby so that the tens minute wheel is moved forward for a certain distance each time that the units minute wheel revolves and brings the notch in the disk turning therewith around to position to admit a tooth on the star wheel, as above explained. This tens minute wheel bears the digits 0, 1, 2, 3, 4 and 5 repeated in two series. This wheel, therefore requires two hours to complete a revolution and must therefore move the hour printing wheel 42 forward twice during a complete revolution. The hour printing wheel 42 is normally locked and periodically unlocked and driven forward by a star wheel 70 carried by a counter-shaft 71 and meshing with a gear 42ª turning with, and preferably formed on, the hour printing wheel 42, the operation of this star wheel 70 in thus locking and driving the hour wheel from the tens minute wheel being similar in all respects to the operation of the units minute wheel in driving and locking the gear 69 and, therefore, the driving and locking of the tens minute wheel to which said gear is secured. In Fig. 16 the tens minute wheel 41 is shown in side elevation, and it will be seen that there are two notches 41ᵇ in the disk 41ª and also two pairs of projections 41ᶜ, as is required by the fact that this wheel must advance the hour wheel twice during a revolution.

The meridian printing wheel 43 has its periphery divided into twelve spaces bearing the legends A. M. and P. M. alternately. As the hour wheel 42 has its periphery divided into twelve spaces numbered from one to twelve, and therefore makes one complete revolution before it is required that the meridian wheel be advanced, the locking and driving disk 42ᵇ (see Fig. 17) of the hour wheel 42 is provided with but one notch 42ᶜ and one pair of projections 42ᵈ. This locking and driving disk operates upon the meridian printing wheel 43 through a pinion or star wheel 72 supported upon a shaft 73 and meshing with the gear 43ª of the meridian wheel 43. When the hour printing wheel and the minute printing wheels have printed 11.59, and are about to change to 12.00, the meridian wheel is advanced to change from A. M. to P. M. or from P. M. to A. M. as the case may be.

The day printing wheel 44 is of greater diameter than the printing wheels of the series above described and is secured on a shaft 44ᵃ of its own, supported in the plates 19 and 20. This day printing wheel 44 is driven from the meridian wheel 43 as follows: Turning loosely on the shaft 65 is a star wheel 74 which has a long bearing extending through the plate 19 and carrying upon its inner end a pinion 75. The pinion 75 meshes with a gear 76 to which is secured a notched or recessed disk 77, the gear 76 and disk 77 being loosely mounted on the shaft 44ᵃ of the day printing wheel 44. Fast on the shaft 44ᵃ is a spring arm 78 which carries a projecting finger 79 arranged to occupy any one of the notches in the edge of the disk 77. The gear 76, and consequently the disk 77, are normally locked by the star wheel 74, and are periodically advanced by said star wheel similarly to the way in which the other star wheels advance and lock the printing wheels following them in the train. As the meridian printing wheel 43 has twelve spaces therearound, printing alternately A. M. and P. M., it is necessary that the pinion 75 be actuated six times during the revolution of the printing wheel 43, or on every alternate forward movement of the wheel 43. The locking and driving disk 43ᵇ of the wheel 43 is therefore formed with six notches 43ᶜ and six pairs of projections 43ᵈ (as seen in Fig. 18). The periphery of the day printing wheel is divided into a number of spaces bearing type adapted to print numbers from 1 to 31 inclusive. By means of the spring arm 78 and the notched disk 77 the shaft 44ᵃ which carries the day wheel is normally but impositively connected to the gear 76. By reason of the fact that this connection is impositive it is possible to manually move the day printing wheel 44 independently of the regular operating mechanism, this being necessary because of the fact that some months do not contain thirty-one days and, therefore, at the beginning of some of the months it is necessary to move the day printing wheel manually forward one or more spaces. This would not be possible if the day printing wheel were rigidly connected with the gear 76. To provide means for manually moving the day wheel when necessary this printing wheel carries a gear 80 secured thereto on the side opposite the gear 76 and disk 77. With this gear 80 meshes a pinion 81 which is fast on the shaft 82, arranged to receive a setting key, whereby the day wheel 44 may be set by the rotation of said shaft and pinion, the notched disk 77 and gear 76 remaining stationary and the spring arm 78 passing around over the disk 77 and jumping from one notch to the next as the day wheel is rotated. The gear movement above described for operating the printing wheels in train is what is known as the Geneva spur gear movement.

It will be observed that by arranging the units minute wheel and the tens minute wheel as shown herein, with the units minute wheel turning on the elongated bearing of the tens minute wheel and between said tens minute wheel and its gear wheel, the star wheel which transmits movement from the units minute wheel to the tens minute wheel is removed from the space between these two printing wheels and placed at one side, thus permitting the units minute wheel and tens minute wheel to be located close together. This results in the printing of a more legible and better appearing impression than would be the case were the units minute and tens minute wheels separated from each other by a considerable space.

A shaft 83 mounted in bearings in the plates 18 and 20, carries, loosely mounted thereon, the month printing wheel 84 and the year printing wheel 85. The month printing wheel 84 has an elongated bearing 86 extending through the year printing wheel 85 so that the latter turns on the sleeve which forms the elongated bearing of the wheel 84. Secured to the sleeve 86, so as to turn with the wheel 84, is a notched disk 87 which normally locks and periodically unlocks and advances a star wheel 88 turning loosely on a shaft 89. This star wheel 88 is arranged to have its wider teeth mesh with and turn a gear 90, formed on or turning with the year printing wheel 85. The month printing wheel 84 has its periphery divided into twelve spaces bearing type adapted to print the names of the months consecutively. At the expiration of each year this wheel moves the year printing wheel forward one space and must, therefore, have the disk 87 which turns therewith, provided with one notch. The month and year printing wheels are not arranged to be advanced by the motor mechanism of the stamp but are moved manually by the application of a setting key to the squared end 91 of the shaft 89, this shaft 89 having fast thereon a disk 92, (see Fig. 8) formed with a projecting tongue 93 arranged to pass into, upon each revolution, one of a series of recesses 94 in the edge of a disk 95 which turns with the month printing wheel, whereby this disk and printing wheel are moved forward to change the reading once during each revolution of the shaft 89 and the setting key. The portion of the periphery of the disk 95 which extends between each two adjacent recesses is curved inwardly on the radius of the disk 92, whereby the engagement of the periphery of the disk 92 with the periphery of the disk 95 normally locks the latter and the month printing wheel against movement. By the rotation of the key and shaft the month printing wheel is turned forward or backward as desired, and the year printing wheel is turned backward or forward one space when the month printing wheel changes its reading from December to January or January to December.

It will be seen that the year printing wheel is locked to the month printing wheel and that the month printing wheel is normally locked and cannot be turned without the use of the setting key.

Pivoted on the pins 5 are two levers 96, 97 having elongated sleeves 98, 99, surrounding the pins, the levers being secured together at their upper ends by a bar 100 extending from one lever to the other, and being secured together at their lower ends by another bar 101. To this bar is secured one end 102 of a retractile spring 103 which extends longitudinally through the base and has its opposite end anchored to a lug 104 on the interior of the casing of the base. The upper ends of these levers bear against the inside of the casing of the arm, the spring 103 thereby tending to raise the head. To normally limit the upward movement of the head a pin 105 is thrust through the base from side to side and just in front of the lower ends of the levers. This pin 105 is so placed that the printing wheels are normally held a short distance from the platen, as seen in Fig. 1, but when it is desired to raise the head to a higher position for the purpose of inspecting the printing wheels, or for any other purpose, the pin may be removed and the head will then rise until the lower ends of the levers engage the curved inner portion 106 of the casing of the base.

Extending through the printing head from side to side and connecting the side plates 17 and 18 together is a cross bar 107 which passes through the head of a bolt 108, the latter extending upward through an opening in the top of the casing of the head and having two nuts 109 and 110 screwed thereupon, whereby the printing head is held up in position in the casing and is made to move therewith. The upper edges of the side plates 17 and 18 rest against shoulders 111 and 112 formed in the thickness of the casing of the head, the head being drawn up to this position by the bolt 108. A knob 113, provided with a central opening for the reception of the bolt 108 and nuts 109 and 110 is placed upon the upper side of the casing surrounding the bolt and is held in place by a third nut 114. A slightly resilient cushion 115, which may be of rubber or the like, is secured upon the knob 113 in position to be struck by the hand when it is desired to depress the head and thereby print upon a paper or other article.

The conductors 116 and 117, which lead to the terminals of the winding of the magnet, are usually inclosed together in a sheath 118 and are brought in through an opening 119 in the rear of the casing of the base, the opening having an insulating bushing 120 arranged therein. Secured to the plate 9 is a lug 121 having a channel 122 cut across its end and having its exterior threaded to receive a nut 123. The insulated double conductor is laid in the channel in this lug and a clamping plate 124 is laid thereupon, after which the nut 123 is screwed down upon the plate 124 and the conductors are thereby secured against strains which might tend to tear the same loose from the binding posts 125 and 126. These binding posts are carried upon and suitably insulated from the plate 9 and are connected by means of resilient strips 127 and 128 with the ends of the wire forming the winding of the magnet coil.

Having thus described my invention, what I claim as new and desire to secure by Letters Patent, is—

1. In a time stamp, the combination with a type wheel, of a ratchet, an alining detachable connection between said wheel and said ratchet, and a dog for intermittently operating said ratchet and arranged to lock the same against movement.

2. In a time stamp having an interlocking train of printing wheels, the combination with a ratchet, of an alining detachable clutch between said ratchet and the first printing wheel of the train, and a dog for intermittently operating said ratchet and arranged to lock the same against movement.

3. In a time stamp, a series of printing wheels geared to be driven in train and each arranged to be normally locked by the preceding wheel in the train and periodically unlocked and advanced, means for driving the first printing wheel of said train and locking the same between driving periods, an impositive lock between the last printing wheel in said train and the preceding printing wheel, a counter-shaft and a pinion thereon meshing with said last printing wheel, said counter-shaft being squared for the reception of a setting key whereby said last printing wheel may be manually turned independently of the other wheels in the train.

4. In a time stamp, a plurality of printing wheels arranged to be driven in train and locked in train, a recessed disk driven in train with said printing wheels and normally locked, another printing wheel carrying a resilient arm arranged to turn therewith and normally to engage said recessed disk, and means for manually turning said last named wheel independently of said disk and the other printing wheels.

5. In a time stamp having an interlocking train of printing wheels, the combination with a clock face, of clock hands geared to one of the train of printing wheels, locking and driving means for the first of the train of printing wheels, and an alining clutch between said wheel and the locking and driving means, said clutch being arranged to be uncoupled by the insertion of a setting instrument whereby the wheels of the train and said hands may be manually moved together to change the reading thereof at will.

6. In a time stamp, the combination with a base, of stamping mechanism pivoted thereto, a housing also pivoted to said base, said stamping mechanism and housing being independently movable about a common axis, and means for normally securing said stamping mechanism and said housing together.

7. In a time stamp, the combination with a base, of a hollow arm open along one of its sides, stamping mechanism, another arm carrying said stamping mechanism, a removable member passing through both of said arms and pivoting said arms to the base, and spring means for raising said arms.

8. In a time stamp, the combination with a pivoted arm, of a casing at the end of said arm, said casing having one side thereof open and a stamping head removable through said open side.

9. In a time stamp having an interlocking train of printing wheels, the combination with an intermittently operating motor mechanism connected to, intermittently operating the first of the train of printing wheels and locking said wheel against movement except during its operating period, of an alining detachable connection between said motor mechanism and the wheel to permit the revolving of the wheel manually.

10. In a time stamp having an interlocking train of printing wheels, the combination with an indicating dial having moving members operated synchronously with the printing wheels of the train of the stamp for indicating the movement thereof, of an intermittently operating motor mechanism connected with, intermittently operating the first wheel of the train of printing wheels and locking said wheel against movement during its operating period, and an alining detachable connection between the motor mechanism and the first wheel of the train of printing wheels to permit the wheel to be revolved manually.

11. In a time stamp having an interlocking train of printing wheels, the combination with a dial having movable members operating synchronously with the printing wheels of the train for indicating the movement of said wheels, of a ratchet connected with the first of the printing wheels of the train for operating the same, a dog for intermittently operating said ratchet and arranged to lock the same against movement, an alining detachable connection between said ratchet and the first wheel of the printing train, means independent of the ratchet for rotating the wheels of the printing train, and means for disconnecting the ratchet from said first wheel when said independent rotating means is operated.

12. In a time stamp having a plurality of revoluble printing wheels arranged to print in a straight line and having a gear movement connecting said wheels and causing them to operate in train, the combination with a motor mechanism connected to and intermittently operating the first of the printing wheels of the train, of an alining detachable connection between the motor mechanism and said wheel to permit the wheel to be operated manually.

13. In a time stamp, the combination with a base, of an arm along one of its sides, a stamping mechanism secured to said arm and having its impression device on its under side, said arm being pivoted to said base, means for holding said arm from normally rising above a predetermined point, and means for disconnecting said means to permit the arm to be freely swung about on its pivot for inspection and repair.

14. In a time stamp, the combination with a base, of an arm pivoted to said base, stamping mechanism secured to said arm and having its impression devices on its under side, a spring tending to move said arm on its pivot to raise the stamping mechanism, stops for preventing said arm from being raised above a predetermined point under the influence of said spring, and means for rendering said stops ineffective to permit said arm to swing freely on its pivot.

15. In a time stamp, an arm having a casing at its end, said casing being open at its lower side, stamping mechanism adapted to be inserted into said open side and forming a unitary structure separable from said arm and casing, and means for holding said stamping mechanism in place in said casing.

16. In a time stamp, the combination of a base, a platen carried by said base, lugs extending upwardly from said base, a head comprising an arm having an end bent downwardly at an angle with its body portion and pivoted to said lugs, said arm being open along its under side, a second arm having an end bent downward and pivoted to said lugs, said second arm being insertible into the open side of said first named arm, an electromagnet secured upon the upper side of said second arm, printing wheels in said head, means for moving said printing wheels to change the reading thereof, and an armature disposed to be acted upon by said electromagnet and arranged in mechanical operative connection with said moving means.

17. The combination of a base, a platen carried thereby, a hollow arm made open along its under side and pivoted at one of its ends to said base, time stamping mechanism in the other end of said arm removable through the open side of said arm, a spring tending to raise said arm, and means for normally limiting the upward movement of said arm, said means being removable to permit said arm to be raised to an abnormal position.

18. In a time stamp, the combination of a base having a pair of upstanding lugs at one of its ends, a platen at its opposite end, a hollow arm inserted between said lugs and pivoted thereto, a second arm within said first-named arm, stamping mechanism carried by the inner arm, and a pair of pins each extending through one of said lugs, the side wall of said outer arm and a portion of said inner arm, whereby said outer and inner arms are pivoted on a common axis.

In witness whereof, I have hereunto subscribed my name in the presence of two witnesses.

CHARLES M. CROOK.

Witnesses:
 M. F. FARRAR,
 CHARLES L. HOPKINS.